United States Patent [19]

Shieh

[11] Patent Number: 5,062,950
[45] Date of Patent: Nov. 5, 1991

[54] PREFAB FILTER TANK WITH WARNING FUNCTION

[76] Inventor: Wen-Yau Shieh, No. 32, Yu Kuang Road, An Ping Area, Tainan City, Taiwan

[21] Appl. No.: 519,399

[22] Filed: May 4, 1990

[51] Int. Cl.⁵ .................... B01D 35/14; A01K 63/04
[52] U.S. Cl. ............................ 210/86; 210/130; 210/169; 210/416.2; 210/502.1; 119/5
[58] Field of Search ............... 210/85, 86, 97, 130, 210/169, 266, 282, 291, 292, 255, 484, 416.2, 502.1, 505; 119/5

[56] References Cited

U.S. PATENT DOCUMENTS

| | | | |
|---|---|---|---|
| 3,746,168 | 7/1973 | Willinger et al. | 210/169 |
| 4,039,453 | 8/1977 | Horvath | 210/169 |
| 4,220,530 | 9/1980 | Gabriele | 210/169 |
| 4,892,651 | 1/1990 | Hill | 210/169 |

Primary Examiner—Peter Hruskoci
Assistant Examiner—Robert James Popovics
Attorney, Agent, or Firm—Morton J. Rosenberg; David I. Klein

[57] ABSTRACT

The present invention relates to a prefab filter tank with warning function for an aquarium which is characterized by a prefab filter tank and a space-adjustable motor seat. The filter tank and the motor seat may be freely combined to meet the filtration requirement of larger aquariums to provide better filtration; by a warning function which may emit light or sound to warn users when filter fibre pads lose their filtration function due to too many impurities deposited thereon, and by a buffer tank provided within one end of the filter tank for continuing the filtration when the filter fibre pads lose their filter function and allowing users to clean or change the filter fibre pads at a later time without endangering the life of fish in the aquarium.

1 Claim, 4 Drawing Sheets

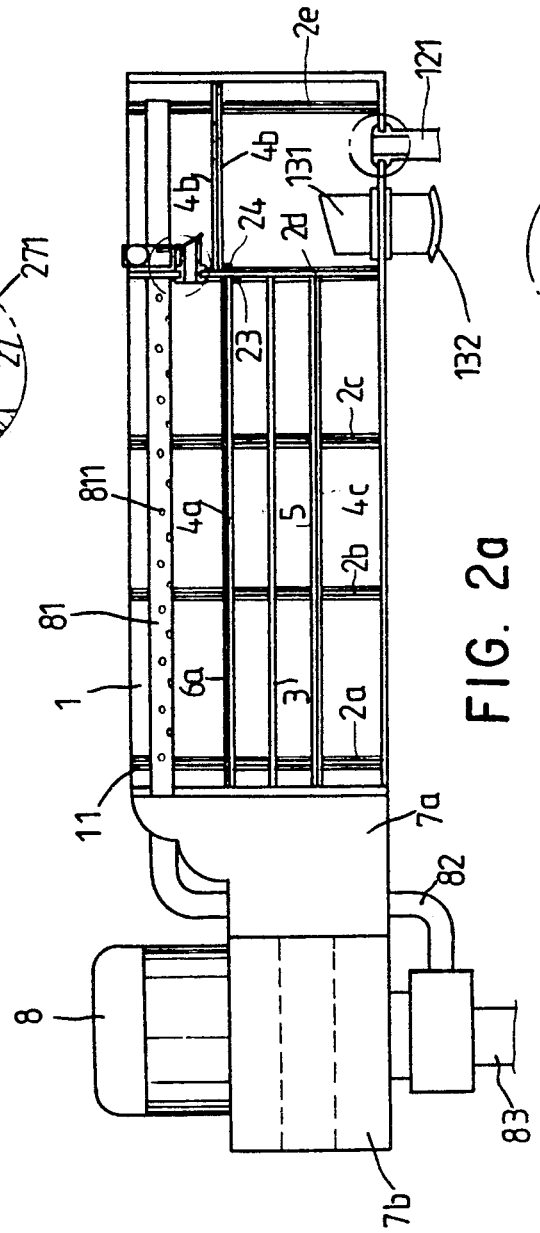
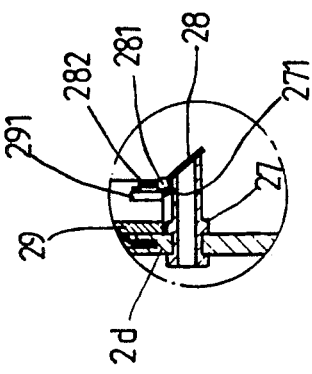
FIG. 2b
FIG. 2a
FIG. 2c

PREFAB FILTER TANK WITH WARNING FUNCTION

BACKGROUND OF THE INVENTION

It is known that a filter tank is a requisite equipment for an aquarium to repeatedly filter water contained therein. However, most present filter tanks are fixed sizes which can not be varied according to the sizes of aquaria in which they are placed. Besides, in conventional aquaria, filter fibre pads are usually immersed in water which reduces filtration effect and causes undesirable death of fish. There is still a shortcoming commonly existing in present filter tanks, that is, there is not any warning mechanism to alarm users when the filter fibre pads lose their filtration function due to impurities deposited thereon, and consequently, users would have to frequently check the filter fibre pads for adequate filtration function. Therefore, a filter tank without warning mechanism would cause much inconvenience to users and has reverse effect on the safe living of fish.

It is therefore tried by the applicant to develop a prefab filter tank with warning function to eliminate the prior shortcomings existing in conventional filter tanks for aquaria.

SUMMARY OF THE INVENTION

It is the first object of the present invention to provide a prefab filter tank so that it may combine with another set or sets of filter tanks to form a filter tank which is best suitable for an aquarium of a particular size and therefore yield the best filtration effect.

Another object of the present invention is to provide a prefab filter tank which has warning function of emitting alarm whenever filter fibre pads in the filter tank lose their filtration function due to too many impurities deposited thereon. With this warning function, users may timely change filter fibre pads or remove deposited impurities.

A further object of the present invention is to provide a prefab filter tank in which a buffer tank is incorporated to continue the filtration in case the filter fibre pads are deposited with too many impurities thereon and lose their filtration function. With this buffer tank, fish in the aquarium may safely live for a period of time even if the users cannot promptly change or clean the filter fibre pads.

BRIEF DESCRIPTION OF THE DRAWINGS

Other objects together with the foregoing are attained in the embodiment of the invention described in the accompanying drawings, in which

FIG. 2a is a sectional front view of the invention showing an assembled embodiment thereof;

FIG. 2b is an enlarged view of a partition of the subject invention shown in FIG. 2a;

FIG. 2c is an enlarged view of a water pipe shown in FIG. 2a;

DETAILED DESCRIPTION OF THE PREFERRED EMBODIMENT

Figure 1:
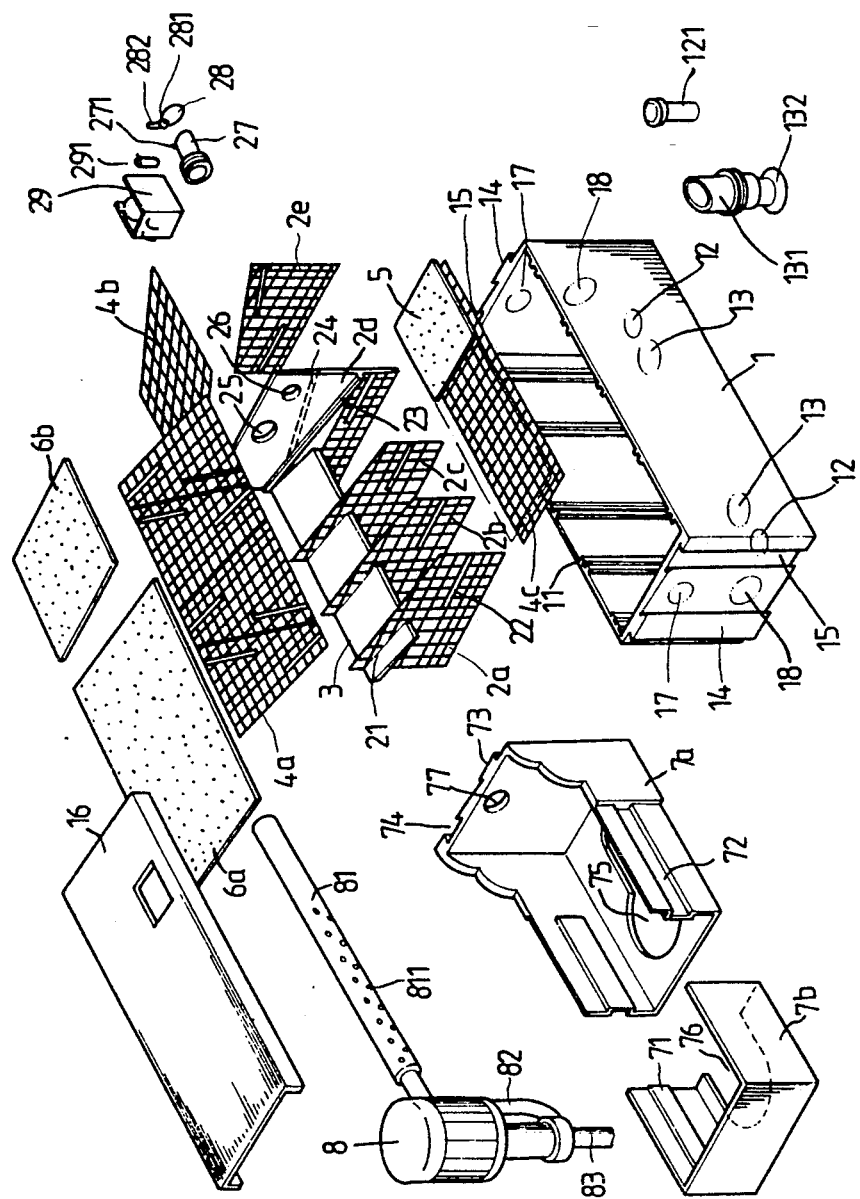
FIG. 1 is a three-dimensional analytical view of the invention.
Figures 3A, 3B, 3C:
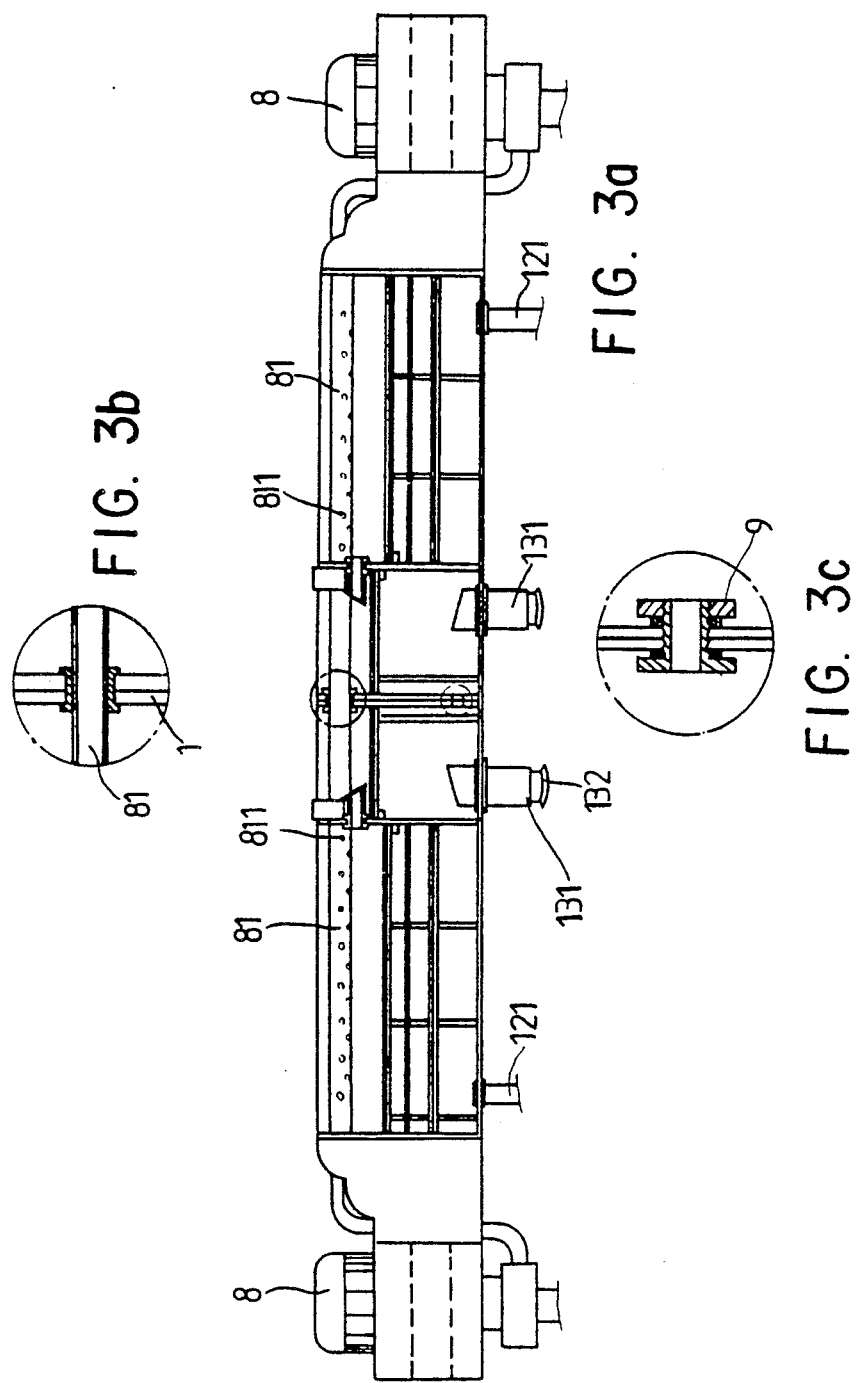
FIG. 3a is a sectional front view showing two sets of prefab filter tanks of the present invention which are combined together.
FIG. 3b is an enlarged section of the subject invention portion showing a water distributing pipe.
FIG. 3c is an enlarged section of the subject invention showing a connection for the filter tank; and, FIG. 4 shows an aquarium in which two filter tanks of the invention are combined and installed.

Please refer to FIG. 1. The present invention mainly includes a filter tank 1, a plurality of partitions 2, a water guiding board 3, a plurality of netted sheets 4, active carbon 5, filter fibre pads 6, motor seats 7a, 7b, a motor 8, an alarm seat 29, an overflow pipe 131, a clean water pipe 121, etc.

The filter tank 1 is generally a rectangular and upwardly open tank with a removable top cover 16. A plurality of partition rails 11 are bilaterally symmetrically formed on the inside of its two longer sides for the partitions 2 to provide fixed support therein. Two sets of two preformed holes 12, 13 are separately provided at the right and left ends of tank bottom, and two sets of two preformed holes 17, 18 are separately provided on the two shorter end walls of the filter tank 1. Before the preformed holes 12, 13, 17, and 18 are actually employed, they are not really opened but have a thin wall in their center which can be easily cut off whenever the holes are needed. On the two shorter end walls of the filter tank 1, two pairs of suitable elongated tenons 14 and mortises 15 are diagonally symmetrically formed permitting a motor seat 7a or another filter tank 1 to join the original filter tank 1 at either end.

In the embodiment as illustrated in the drawings, a total of five partitions are used and are numbered as 2a, 2b, 2c, 2d, and 2e hereinafter; among which, partitions 2a, 2b, and 2c are provided with a slant slot 21 for the water guiding board 3 to be inserted in and supported thereon; the width of these slant slots 21 is about one half of the width of the partitions. At the other half side of these partitions opposite to the slant slots 21, level slots 22 are formed at a position slightly lower than the lower end of the slant slots 3 for a netted sheet 4c and the active carbon 5 to be placed on.

In the embodiment as illustrated in the drawings, a total of three netted sheets 4a, 4b, and 4c are used; among which, the netted sheet 4c is inserted in the level slot 22 as aforesaid, and the netted sheets 4a, 4b are mounted at two sides of the main partition 2d on tops of the partitions 2a, 2b, 2c, and 2e, respectively. Two protruded edges 23, 24 are formed on each side surface of the main partition 2d with heights and incline degrees corresponding to partitions 2a, 2b, 2c, and 2e, respectively, so that the inner edges of the netted sheets 4a and 4b may be supported thereon.

The main partition 2d is generally divided into two portions, the portion below the level slot 22 is meshy, and the portion above the level slot 22 is a solid board. A through hole 25 is formed on higher portion of this solid board corresponding to the holes 17 for a water distributing pipe 81 to pass. A through hole 26 is also formed on this solid board portion allowing a tube head 27 to be transversely inserted therein. The one end of the tube head 27 extending into the right side of the main partition 2d has a downward and outward slant rim, two bowlshaped seats 271 are disposed near the slant pipe rim for a downward extending shutter 28 and a projected rod 281 to pivotally connect thereat. The shutter 28 has a press plate 282 extending from its upper end and passing the projected rod 281. A microswitch 291 is positioned in front of the press plate 282 and is in alignment with the press plate 282 and the shutter 28. The microswitch 291 together with a alarm lamp or a buzzer are disposed in a alarm seat 29 which is mounted on the main partition 2d and extends out the tank top cover 16 when the top cover 16 is covered.

Filter fibre pads include two pieces and are separately placed on the top surfaces of the netted sheets 4a and 4b for filtering impurities in water.

Motor seats 7a and 7b are designed in such manner that two sliding bars 71 formed on and inside the side walls of the motor seat 7b can fitly match with and slide in the two corresponding sliding rails 72 formed on and outside the side walls of the motor seat 7a. In which, motor seat 7a is used to support the body of motor 8; an elongated tenon 73 and an elongated mortise 74 are separately formed on the end wall of the motor seat 7a to correspond to the mortises 15 and the tenons 14 on the end walls of the filter tank 1 so that an assembled motor seat 7 may be attached to either side of a filter tank 1. A keyhole-shaped opening 75 is formed in the bottom of the motor seat 7a and can cooperate with a generally oblong opening 76 formed in the bottom of the motor seat 7b to adjust the space left in the opening 75 so that opening 75 is adapted to receive motors of any specification. A through hole 77 is also formed on the end wall of the motor seat 7a at a position corresponding to the preformed holes 17 on the end walls of the filter tank 1 and the through hole 25 on the main partition 2d for the water distributing pipe 81 to pass. The water distributing pipe 81 has one end connected to a pipeline 82 extended from the outlet of the motor 8 and an opposite end being formed as closed. A plurality of small holes 811 are formed on the water distributing pipe 81 at the section between the partition 2a and the main partition 2d when it passes the hole 77, 17, and 25. Water pumped into the water distributing pipe 81 by the motor 8 may be sprayed over the filter fibre pad 6a through these small holes 811.

Figure 4:
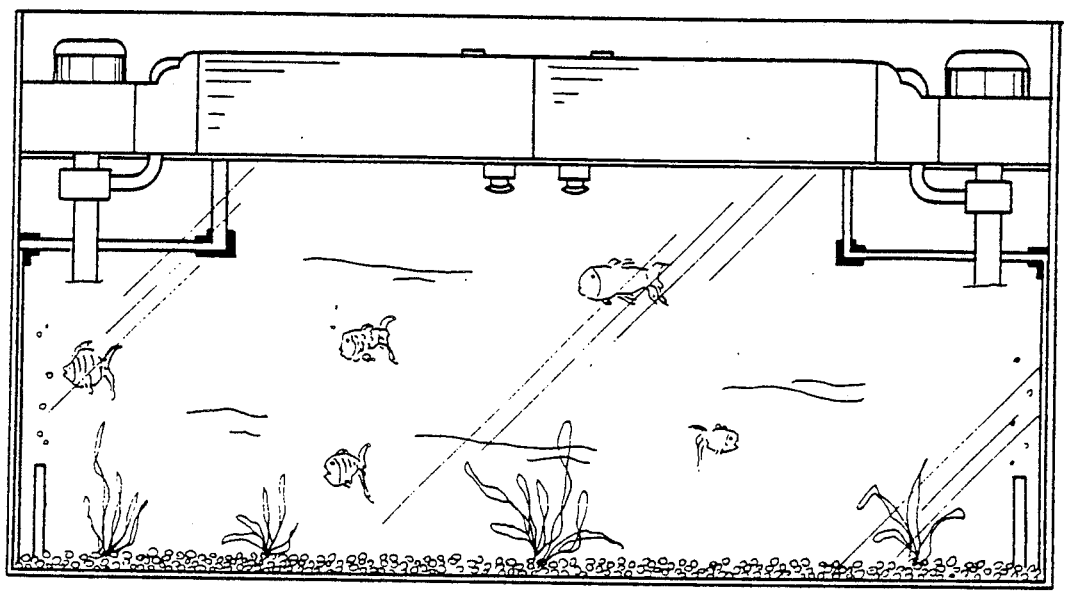

Please refer to FIG. 2, in which, a motor 8 is disposed at lefthand of a filter tank 1. Water in the lower portion of an aquarium is sucked and pumped into a inlet pipeline 83 provided at the lower end of the motor 8 and delivered to the outlet pipeline 82, and is finally sprayed over the filter fibre pad 6a placed between the partitions 2a and 2d through the small holes 811 on the water distributing pipe 81. Water which passes the filter fibre pad 6a shall directly flow down to or indirectly pass the slantly disposed water guiding board 3 and is then guided to the active carbon 5 for thorough and complete purification, filtration, and deodorization (please also refer to FIG. 1 for details). Water passed these two filtration procedures will now reach the bottom of the filter tank 1 and is guided to flow down to the aquarium through the clean water pipe 121 or the overflow pipe 131 being inserted into the preformed holes 12 or 13 on the tank bottom after the center of the preformed holes 12 or 13 is cut off. With repeat circulation and filtration, any impurities or undesirable particles in water will be continually filtered and kept on the filter fibre pad 6a and an ideal filtration effect may be achieved. Clean water may flow into the lower portion of the aquarium from the clean water pipe 121 through a hose connected thereto or flow down to the aquarium from the overflow pipe 131 through a float 132 which may eliminate noise generated by the flowing down of water. (Please refer to FIG. 4.)

Please refer to FIG. 2 again, the warning function of the present invention is performed by the cooperation of the press plate 282 with the microswitch 291. In normal filter operation, water passes the filter fibre pad 6a and flows down to bottom of the aquarium. However, when the filter fibre pad 6a is deposited with and blocked by too many impurities, it is possible to have build-up of water on the filter fibre pad 6a because the volume of water flowing in kept unchanged while the filter fibre pad 6a has lost its filter effect. When the build-up of water reaches a height which exceeds the height of the pipe head 27, water will pass the through hole 26 and pipe head 27, and flows into a buffer tank at the other side of the main partition 2d. When water flows through the pipe head 27, it will then force the shutter 28 to leave the slant pipe rim, where it is normally held due to the force of gravity. At this point, the swing of the shutter 28 causes the press plate 282 to actuate the microswitch 291 which in turn actuates the alarm lamp or the buzzer to warn users that timely cleaning or change of the filter fibre pad 6a is required.

Since the filter tank 1 and motor seats 7a, 7b are designed with a structure that facilitates combination or assembly of more than one filter tank 1 or motor seat 7, the present invention may be freely combined to meet different and larger volume requirements in water filtration as well as different motor specifications. The motor seat 7 may be joined to either the right or left side of a filter tank 1 or to both ends of two filter tanks 1 combined by using adequate numbers of connections 9 to provide better and larger circulation and filtration effect for a larger aquarium.

We claim:

1. A prefab filter tank with warning function comprising a filter tank, a plurality of partitions, a water guiding board, a plurality of netted sheets, active carbon, filter fibre pads, motor seats, an alarm lamp seat, an overflow pipe, and a clean water pipe, wherein said filter tank is generally a rectangular and upward open tank with a removable top cover, a plurality of partition rails are bilaterally symmetrically formed on the inside of its two longer side walls for partitions to be fixedly supported therein, two sets of two preformed holes are separately provided at two ends of tank bottom, another two sets of preformed holes are separately formed on the two shorter end walls, and two pairs of suitable elongated tenons and mortises are diagonally symmetrically formed outside the two end walls normal to the tank bottom;

said water guiding board is inserted in slant slots formed at one side of the partitions, said slant slots have width of about one half the width of said partitions;

said netted sheets and active carbon are inserted in level slots formed at the opposite side of said partitions in a position slightly lower than the lower end of said slant slots; two of said netted sheets are separately placed on tops of partitions positioned at two sides of a main partition, a filter fibre pad is placed on each of said netted sheets on tops of said partitions;

said main partition has a meshy portion below its level slot and has a solid plate portion above its level slot, two through holes are formed in said solid plate portion for said water distributing pipe and a pipe head to transversely pass there, said pipe head has an outward and downward slant pipe end extending into the space between said main partition and one end wall of said filter tank with a shutter pivotally connected to the top of said slant pipe end, the upper end of said shutter extends to form a press plate which is closely aligned with a microswitch, said microswitch together with an alarm lamp or a buzzer are disposed in said alarm lamp seat mounted on said main partition and with its top projected out said tank top cover when said cover is covered on said filter tank;

said motor seat is assembled by two parts which join with each other by matching sliding bars and sliding rails separately formed on their two side walls, on one of said motor seat parts, vertical tenon and mortise are formed at its end wall to match said tenons and mortises formed on two end walls of said filter tank permitting said motor seat to join to said filter tank at either end; a keyhole-shaped opening is formed on bottom of one of said motor seat parts and cooperates with an oblong opening formed on bottom of another motor seat part to adjust space left on bottom of said motor seat for receiving a motor, and a through hole is formed on one end wall of said motor seat corresponding to said preformed holes on two end walls of said filter tank and said one of through holes on said main partition for said water distributing pipe to pass.

* * * * *